(12) United States Patent
Sifferman et al.

(10) Patent No.: US 7,369,458 B2
(45) Date of Patent: May 6, 2008

(54) TRANSDUCER IDENTIFICATION

(75) Inventors: Andrew M. Sifferman, Bedford, NH (US); Frederic S. Boericke, II, Mont Vernon, NH (US); Stephen G. Boucher, Amherst, NH (US)

(73) Assignee: Airmar Technology Corporation, Milford, NH (US)

( * ) Notice: Subject to any disclaimer, the term of this patent is extended or adjusted under 35 U.S.C. 154(b) by 265 days.

(21) Appl. No.: 11/125,301

(22) Filed: May 9, 2005

(65) Prior Publication Data
US 2005/0259517 A1 Nov. 24, 2005

Related U.S. Application Data

(60) Provisional application No. 60/569,785, filed on May 10, 2004.

(51) Int. Cl.
*H04B 17/00* (2006.01)

(52) U.S. Cl. ...................................... 367/13

(58) Field of Classification Search .................. 367/13, 367/903
See application file for complete search history.

(56) References Cited

U.S. PATENT DOCUMENTS

| | | | |
|---|---|---|---|
| 4,467,273 A | 8/1984 | Rudolph et al. | |
| 4,651,309 A | 3/1987 | Honda | |
| 4,809,242 A | 2/1989 | Oka et al. | |
| 4,893,284 A * | 1/1990 | Magrane | 367/13 |
| 4,926,872 A | 5/1990 | Brock-Fisher et al. | |
| 5,115,416 A | 5/1992 | Gehlbah et al. | |
| 5,151,085 A * | 9/1992 | Sakurai et al. | 604/22 |
| 5,209,235 A * | 5/1993 | Brisken et al. | 600/466 |
| 5,505,203 A | 4/1996 | Deitrich et al. | |
| 5,617,866 A | 4/1997 | Marian, Jr. | |
| 5,857,777 A | 1/1999 | Schuh | |
| 5,971,597 A | 10/1999 | Baldwin et al. | |
| 5,997,478 A * | 12/1999 | Jackson et al. | 600/437 |
| 6,035,240 A | 3/2000 | Moorehead et al. | |
| 6,047,219 A | 4/2000 | Eidson | |
| 6,113,547 A | 9/2000 | Catallo et al. | |

(Continued)

FOREIGN PATENT DOCUMENTS

EP 0 713 102 A1 5/1996

(Continued)

*Primary Examiner*—Dan Pihulic
(74) *Attorney, Agent, or Firm*—Hamilton, Brook, Smith & Reynolds, P.C.

(57) ABSTRACT

A transducer identification system provides transducer characteristic information to an echosounder. The echosounder, in turn, utilizes the transducer characteristic information to alter its functionality or parameters to optimize its performance. The transducer characteristic information can be any combination of a) the resonant frequencies of the transducer; b) the impedances of the transducer at the transducer's resonant frequencies; c) the transducer's power rating; d) the date of manufacture of the transducer; e) the peak transmitting voltage response of the transducer; f) the receiving voltage response of the transducer; g) the figure of merit of the transducer; h) the model number of the transducer; i) the serial number of the transducer; j) the transducer's aging coefficient; k) information regarding the configuration of the transducer, such as the housing style, arrangement of piezoelectric elements, and type of acoustic window; l) the beam width of the transducer; m) configuration and calibration information regarding an included temperature sensor; and n) configuration and calibration information regarding an included speed sensor.

13 Claims, 7 Drawing Sheets

U.S. PATENT DOCUMENTS

| | | | |
|---|---|---|---|
| 6,121,892 A | 9/2000 | Reindl et al. | |
| 6,325,759 B1 | 12/2001 | Pelissier | |
| 6,338,716 B1 * | 1/2002 | Hossack et al. | 600/459 |
| 6,470,286 B1 * | 10/2002 | Seip et al. | 702/99 |
| 6,500,126 B1 | 12/2002 | Brock-Fisher | |
| 6,571,132 B1 | 5/2003 | Davis et al. | |
| 6,574,679 B1 | 6/2003 | Chliwnyj et al. | |
| 6,761,698 B2 * | 7/2004 | Shibata et al. | 601/2 |
| 6,787,974 B2 * | 9/2004 | Fjield et al. | 310/335 |
| 7,031,865 B2 | 4/2006 | Bathurst et al. | |
| 7,207,940 B2 * | 4/2007 | Satoh | 600/437 |
| 2002/0011118 A1 | 1/2002 | Zimmerman et al. | |
| 2002/0107538 A1 | 8/2002 | Shibata et al. | |
| 2002/0109578 A1 | 8/2002 | Hansen | |
| 2002/0147936 A1 | 10/2002 | Wiczer | |
| 2002/0169977 A1 | 11/2002 | Chmaytelli | |
| 2003/0120832 A1 | 6/2003 | Gregory | |
| 2003/0143963 A1 | 7/2003 | Pistor et al. | |
| 2003/0199794 A1 * | 10/2003 | Sakurai et al. | 601/2 |
| 2003/0212500 A1 | 11/2003 | Shupe et al. | |
| 2004/0220463 A1 * | 11/2004 | Satoh | 600/407 |
| 2005/0033201 A1 * | 2/2005 | Takahashi et al. | 601/2 |
| 2005/0251035 A1 * | 11/2005 | Wong et al. | 600/437 |
| 2005/0259517 A1 * | 11/2005 | Sifferman et al. | 367/903 |

FOREIGN PATENT DOCUMENTS

| | | | |
|---|---|---|---|
| GB | 2414077 A | * | 11/2005 |
| JP | 2003305050 A | * | 10/2003 |
| JP | 2004093271 A | | 3/2004 |
| WO | WO 99/18496 | | 4/1999 |
| WO | WO 00/69340 | | 11/2000 |

* cited by examiner

FIG. 7

TRANSDUCER IDENTIFICATION

RELATED APPLICATION

This application claims the benefit of U.S. Provisional Application No. 60/569,785, filed on May 10, 2004, the entire teachings of which are herein incorporated by reference.

BACKGROUND OF THE INVENTION

Sonar devices are well known in the art and find widespread use in sport fishing, navigation, scuba diving, as well as any number of other recreational or commercial activities. Typically, a sonar system will include a sonar unit, which includes a display for providing information to the operator, and a transducer which is mounted under the waterline for generating an ultrasonic pulse and receiving echoes from objects in the water, or the bottom surface. The electronic circuitry for driving the transducer to transmit an acoustic pulse and for amplifying and filtering received echoes has traditionally been located in the sonar unit. Locating such circuitry in the sonar unit has, heretofore, provided a number of advantages, such as: there is more likely to be ample room for the circuitry in the sonar unit while the transducer tends to be comparatively small; the environment of the sonar unit is relatively benign, at least when compared to the environment of the transducer; and the cost of replacing a lost or damaged transducer is less when its associated circuitry is located remotely.

In such a system, driver circuitry in the sonar unit produces a pulse consisting of several cycles of an ultrasonic signal at a fairly high output power. This pulse is delivered to the transducer via a shielded twisted pair cable. After transmission of the sonar pulse, the transducer is typically used to "listen" for echoes. Received echoes produce very small signals, on the order of a few millivolts, which are sent via the transmission line to the receiver circuitry in the sonar unit. In the sonar unit, the received echoes are amplified, filtered, and analyzed.

It is widely accepted that some sonar frequencies are better suited for a particular purpose than other sonar frequencies. While most low priced sonar units operate at only a single frequency, and some moderate and high-end units add a second frequency, recreational sonar units operate at frequencies which represent a compromise designed to serve the sport fisherman reasonably well. Not only does a broader selection of frequencies allow tailoring of a sonar system for a particular environment, it allows multiple units to be used in a small area.

Today's transducers only provide depth, speed, and temperature data to the echosounder or fishfinder device which processes and displays the data to the operator.

SUMMARY OF THE INVENTION

Occasionally it is desirable on a given vessel to replace or upgrade the sonar unit with a newer model. In such a case, it is often desirable to use the originally installed transducer with the new sonar unit. Questions of compatibility between the old transducer and the new sonar unit inevitably arise. Often, the transducer is installed in a difficult-to-access location, and identification markings may have become lost or obscured, resulting in difficulty ascertaining the information required to determine compatibility.

The present invention provides additional information to the fishfinder device or echosounder. The additional information allows the echosounder to alter its functionality or parameters to optimize performance. Examples of types of information provided by the present invention include, but are not limited to, a) the resonant frequency of the transducer; b) the impedance of the transducer at the transducer's resonant frequency; c) the transducer's power rating; d) the date of manufacture of the transducer; e) the peak transmitting voltage response of the transducer; f) the receiving voltage response of the transducer; g) the figure of merit of the transducer; h) the model number of the transducer; i) the serial number of the transducer; j) the transducer's aging coefficient (i.e. the rate at which the transducer's resonant frequency changes over time); k) information regarding the configuration of the transducer, such as the housing style, arrangement of piezoelectric elements, and type of acoustic window; l) the beam width of the transducer; m) configuration and calibration information regarding an included temperature sensor; and n) configuration and calibration information regarding an included speed sensor.

Therefore, in accordance with the invention there is provided a transducer identification system for a marine vessel including an echosounder, an ultrasonic transducer containing identification information related to the ultrasonic transducer and a communications bus electrically coupling the echosounder and the transducer, the communications bus communicating the identification information from the transducer to the echosounder. The echosounder alters its parameters based on the identification information to optimize overall performance of the system. In one embodiment, the communications bus can be a single wire bus, however it should be understood by one skilled in the art that any known communications bus can be used.

In another embodiment a transducer identification system for a marine vessel includes an ultrasonic transducer adapted to be mounted below the waterline for generating an acoustic signal and detecting an echo signal and digitizing the echo signal and a digital data bus for coupling transducer identification information and the digitized signal to an echosounder adapted to be mounted on a marine vessel.

In yet another embodiment a transducer identification system for a marine vessel, includes a housing adapted to be mounted below the waterline, the housing containing an ultrasonic transducer for generating an acoustic signal and detecting an echo signal, a speed sensor for providing a digitized signal of a speed of the vessel, a temperature sensor for providing a digitized signal of a temperature of water and a digital data bus for coupling transducer identification information and the digitized signals to an echosounder adapted to be mounted on the marine vessel.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

In general, an echosounder and its associated ultrasonic transducer are located in two separate areas of a marine vessel. The echosounder and associated circuitry is typically located in the vessel's driving station and includes a display for providing information to the operator. On the other hand, the ultrasonic transducer per se is typically mounted on the vessel below the waterline for generating an ultrasonic pulse and receiving echoes from objects in the water, or the bottom surface. The echosounder does not know what type of transducer it will be connected to and its specific characteristics. These characteristics, if known by the echosounder can be used to optimize the performance of the overall system and/or to protect the ultrasonic transducer from overdrive. Optimization can be as simple as altering a feature set or parameters of the echosounder. Types of characteristics include, but are not limited to power rating, nominal frequency, actual resonant frequency, beamwidth, bandwidth or Q, impedance, date of manufacture, ceramic aging coefficient, model number, serial number, housing style, arrangement of piezoelectric elements, type of acoustic window, beam width, configuration and calibration information regarding an included temperature sensor, and configuration and calibration information regarding an included speed sensor.

Several of these characteristics can be provided for multiple frequencies associated with the transducer. The characteristic data can be displayed directly to the end user. These data, such as beamwidth and power capability, are valuable information to the end user.

The following are examples of optimizations that can be performed by the echosounder. 1) The echosounder can dynamically tune the matching circuitry within the echosounder to provide optimum energy transfer using the impedance of the transducer at the transducer's resonant frequency. 2) The echosounder can automatically limit its sonar transmit power to prevent damage to the transducer using the transducer's power rating. 3) The echosounder can adjust its transmit frequency and receiver bandpass to compensate for a change in the transducer's frequency characteristic by knowing the approximate resonant frequency of the transducer at any point of time in the future using the date of poling of the piezoelectric elements within the transducer, the aging coefficient of these piezoelectric elements, and the resonant frequency at the time of manufacture. 4) The echosounder can approximate an absolute sensitivity calibration for exacting applications using the transducer's transmitting voltage response, receiving voltage response, and figure of merit (insertion loss). 5) The echosounder can calibrate the speed of the vessel for transducers that include an embedded speed sensor by knowing the transducer's housing style.

Dealers and end users typically replace the echosounder before replacing the ultrasonic transducer because transducers are difficult and costly to replace. However, frequently the old transducer is not compatible with the new echosounder. This incompatibility can be difficult to determine by dealers and end users. The present invention allows the end user to easily determine if the transducer is compatible with the echosounder.

Figure 1:
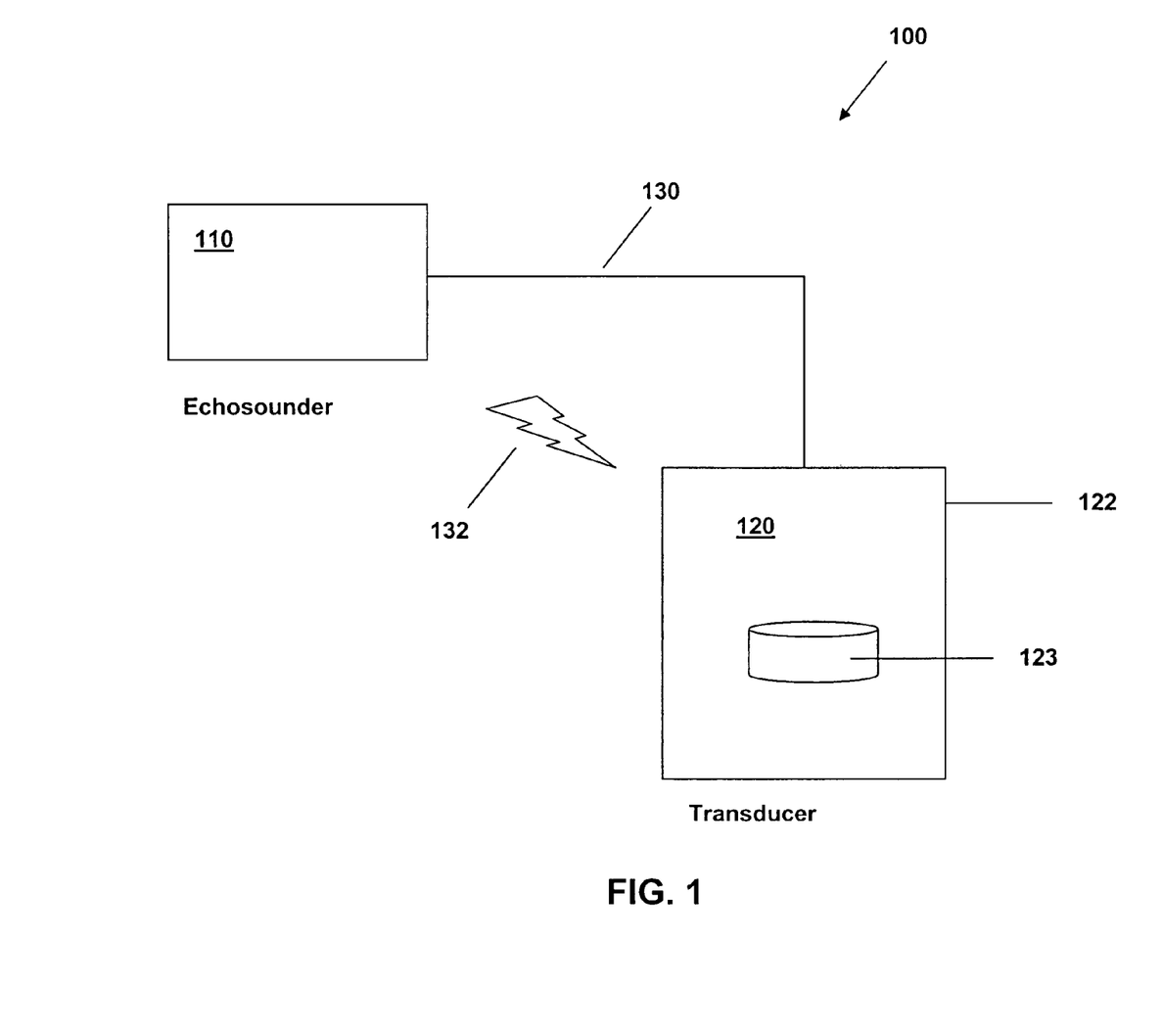
FIG. 1 is a block diagram of a Transducer ID system.

As shown in FIG. 1, a Transducer ID system 100 includes an echosounder 110, an ultrasonic transducer 120, and an identification bus (ID bus) 130. Ultrasonic transducers 120 contain one or more piezoelectric elements 123 having varying characteristics. These piezoelectric elements 123 are contained within a housing 122 of the transducer assembly 120 that can be adapted to be mounted to a marine vessel. The echosounder 110 contains electronic circuitry for driving the piezoelectric elements 123 within the transducer 120 to transmit an ultrasonic acoustic pulse and for amplifying and filtering received echoes from the piezoelectric elements 123.

A non-volatile memory device containing the transducer's characteristic information can be contained within a microcontroller located within the ultrasonic transducer 120. Upon system initialization or power-up, the microcontroller or state machine located within the transducer 120 can communicate the transducer's characteristic information from the memory device to the echosounder 110 via an ID bus 130. The ID bus 130 can be a single conductor (wire) plus a ground return in the transducer cable, a multi wire bus, or a fiber optic cable. In another embodiment, the transducer 120 can communicate to the echosounder 110 through an optional wireless communications link 132. It should be understood by one skilled in the art that any form of communications can be used to communicate between the transducer and the echo sounder.

The Transducer ID system 100 consists of circuitry in both the ultrasonic transducer 120 and the echosounder 110. The echosounder 110 provides power to the circuitry in the ultrasonic transducer 120. The ID bus 130 can be used to provide power to a memory device and a microcontroller located in the ultrasonic transducer 120, as well as to allow bi-directional serial communication (half duplex) between the echosounder 110 and the ultrasonic transducer 120.

Transducers 120 can include speed and temperature sensors. A speed sensor can be of the paddlewheel type and a temperature sensor can be a thermistor. In transducers 120 that include a paddlewheel speed sensor, the ground return for the speed sensor circuit can serve as the ground return for the ID bus 130, while in transducers 120 that include a temperature sensor, but not a paddlewheel, the ground return for the ID bus 130 can be combined with one side of the thermistor. However, in transducers 120 which do not include speed or temperature sensors, the ground return for the ID bus 130 can be a separate conductor within the transducer cable.

Figure 2:
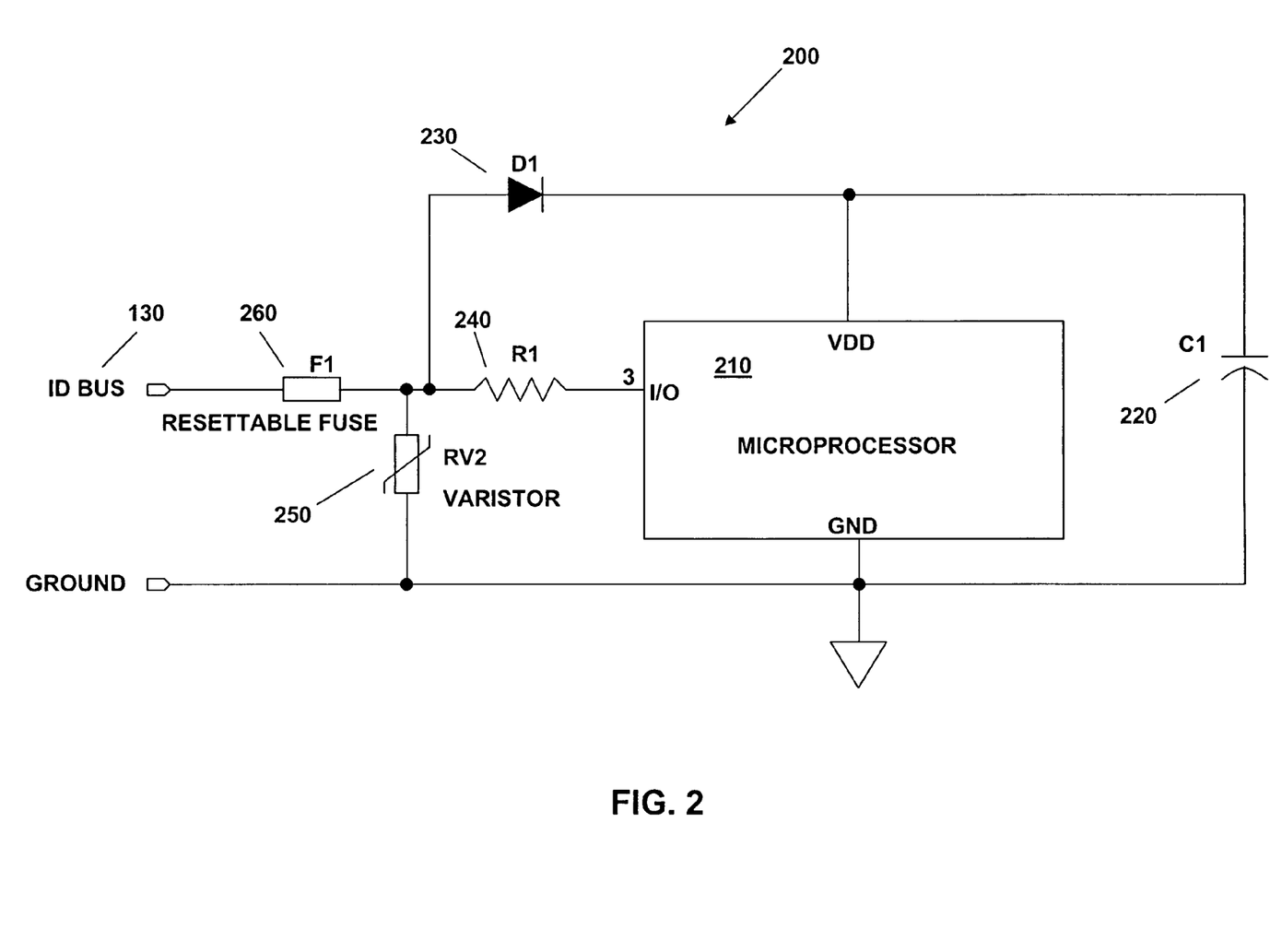
FIG. 2 is a circuit diagram of Transducer ID hardware for a transducer.

FIG. 2 shows a circuit diagram for Transducer ID hardware 200 for the ultrasonic transducer 120. In one embodiment, a microcontroller 210, such as a Microchip PIC12F629 can be used as the memory device and processor located in the ultrasonic transducer 120 (FIG. 1). The microcontroller 210 can have a wide operating voltage range of 2.0 to 5.5 volts. The microcontroller 210 can contain an internal 4 MHz RC oscillator which draws less than 1 mA at 5.5V. The microcontroller 210 can also contain 1024 words of one-time-programmable flash memory for program storage, 64 bytes of static RAM, and 128 bytes of EEPROM data memory.

The Transducer ID hardware 200 for the ultrasonic transducer 120 can also include a capacitor 220, a diode 230, a resistor 240, a varistor 250, and a resettable fuse 260. The capacitor 220, when charged, powers the microcontroller 210. The diode 230 isolates the capacitor 220 from the ID bus 130 to allow for fast data transitions, and prevents the capacitor 220 from discharging down the ID bus 130. The varistor 250 protects the microcontroller 210 from voltage transients (particularly the sonar high voltage transmitter in the event of mis-wiring). The resettable fuse 260 protects the circuit in the event a high DC voltage (i.e. ship's supply, usually 12 volts) is inadvertently applied to the ID bus 130. The resistor 240 provides current limiting to protect the PIC input of the microcontroller 210.

Pin 3 of the microcontroller 210 is a bi-directional input/output port. Pin 3 can serve as an input to receive serial commands from the echosounder 110. A pull-up resistor internal to microcontroller 210 pulls the input high when the ID bus 130 is in the high-impedance state. During Read operations, the pin 3 reverses direction and becomes an output to drive the ID bus 130 low.

Figure 3:
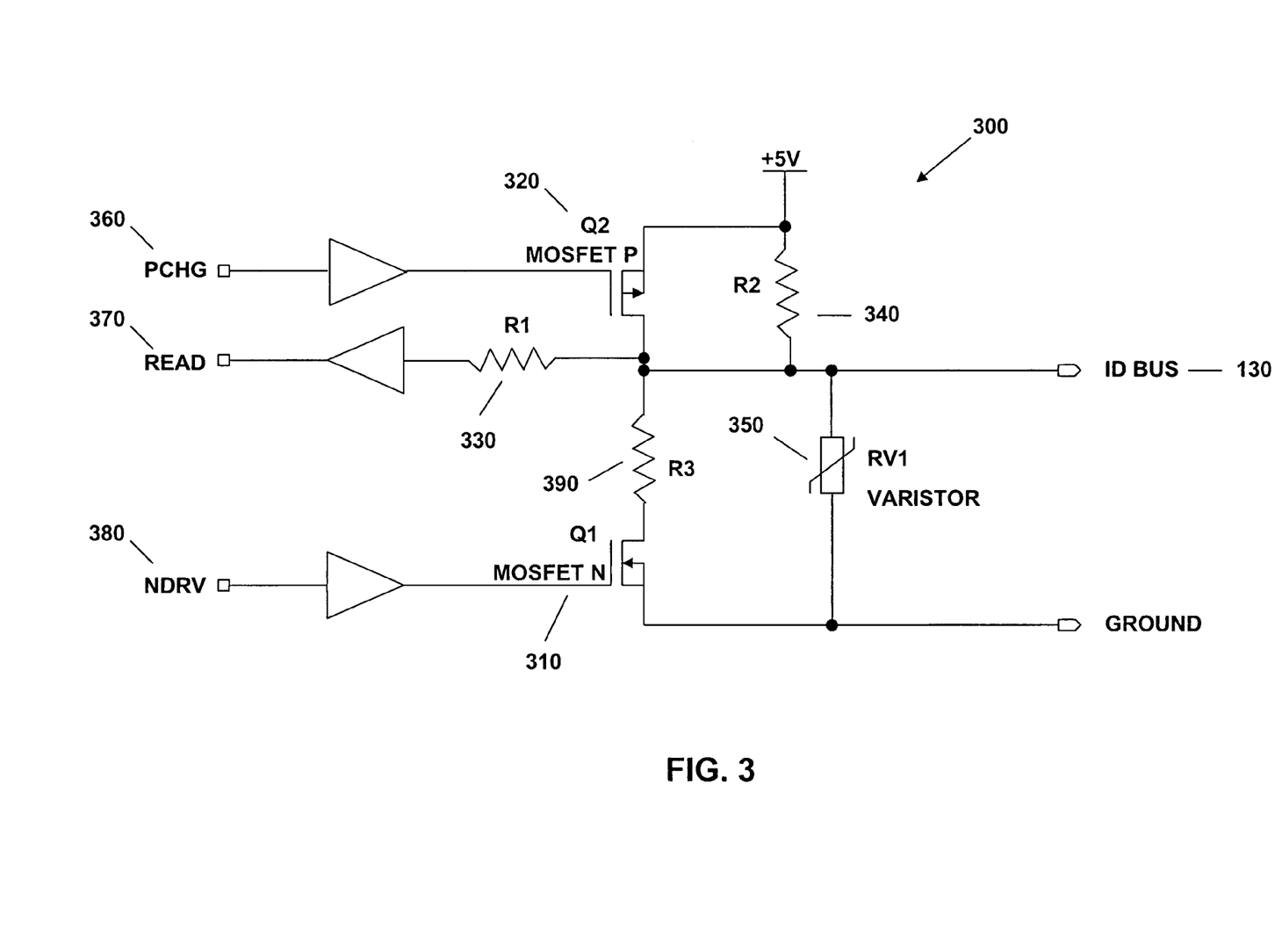
FIG. 3 is a circuit diagram of Transducer ID hardware for an echosounder.
Figure 4:
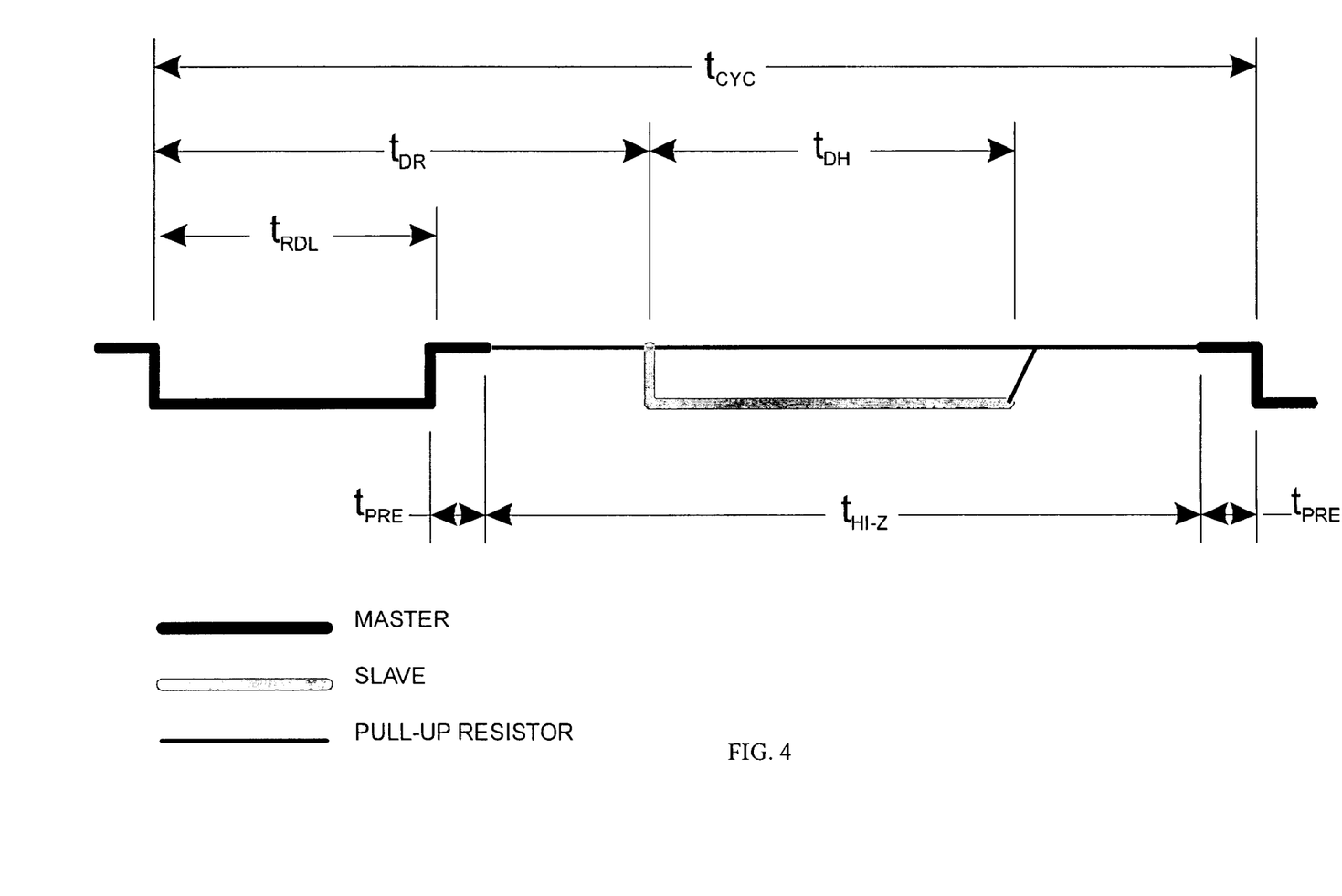
FIG. 4 shows a "read" bit primitive timing diagram.
Figure 5:
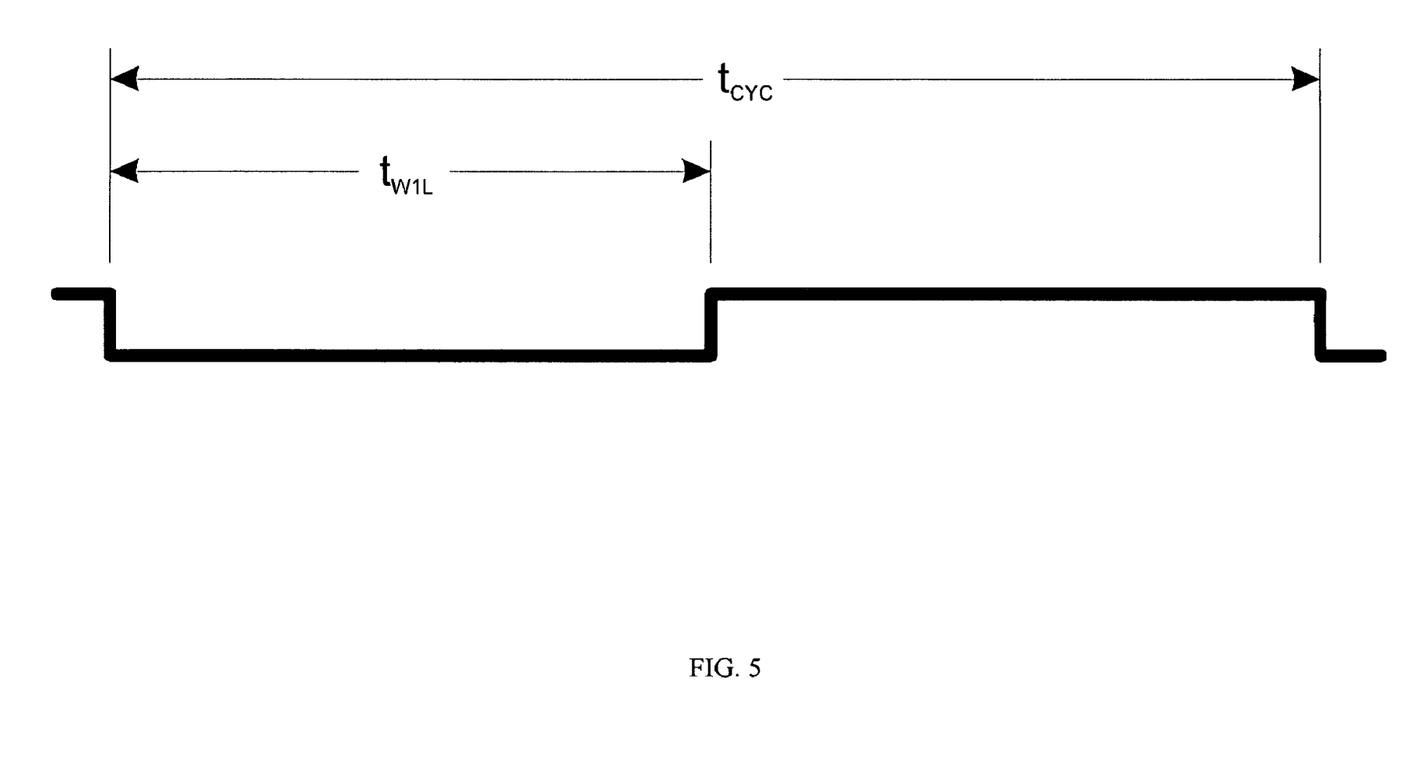
FIG. 5 shows a "write 1" bit primitive timing diagram.
Figure 6:
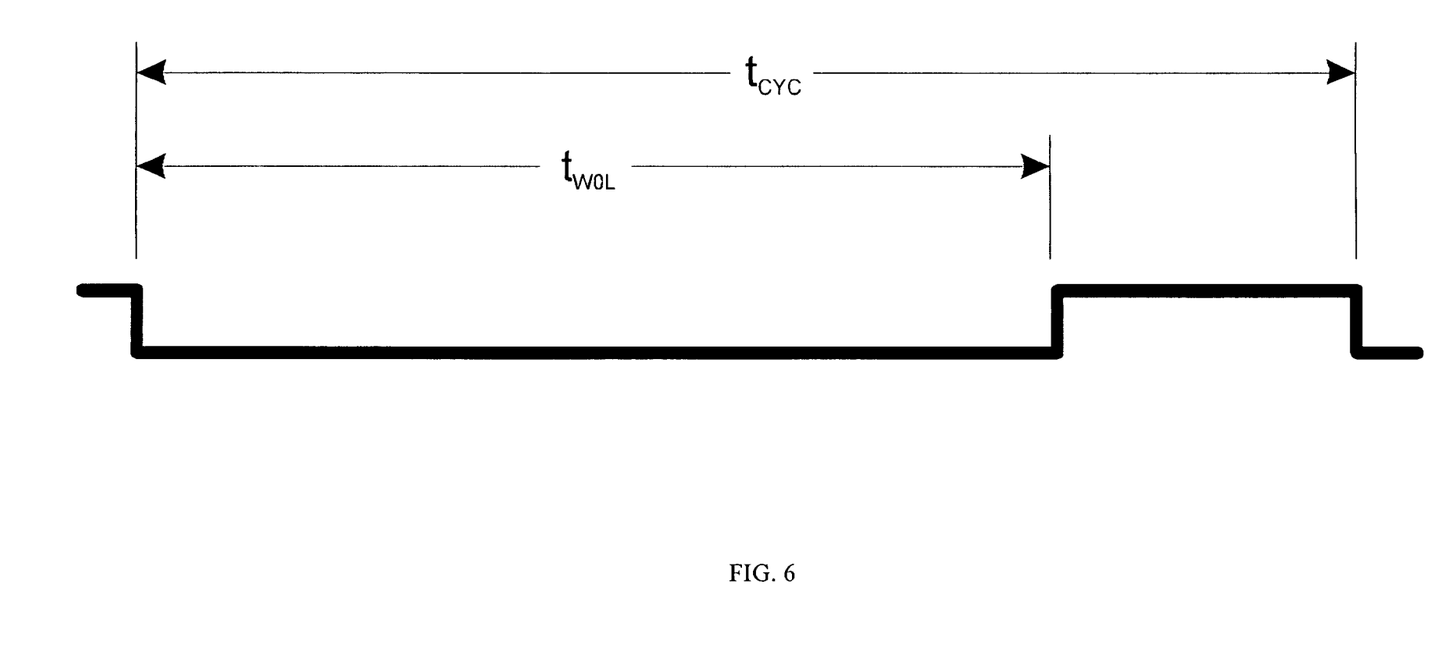
FIG. 6 shows a "write 0" bit primitive timing diagram.
Figure 7:
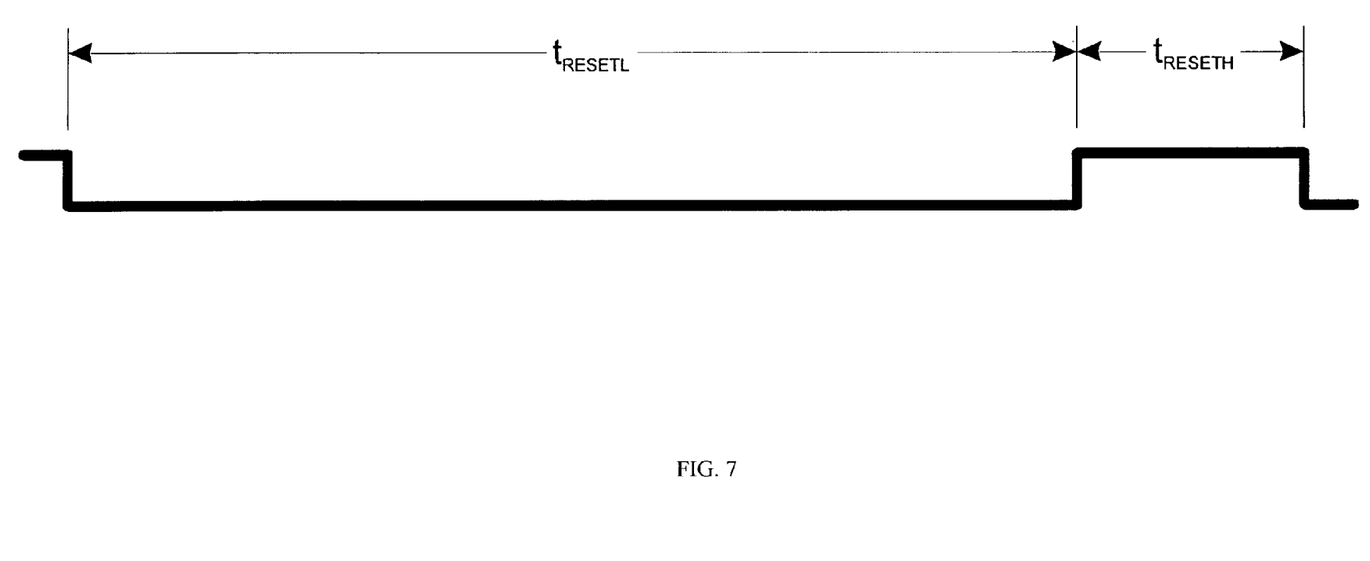
FIG. 7 shows a "reset" bit primitive timing diagram.

FIG. 3 shows a circuit diagram for Transducer ID hardware 300 for the echosounder 110. The echosounder 110 (FIG. 1) provides three functions in hardware:

1) drive the ID bus 130 high to +5 volts to charge the capacitor 200 (FIG. 2) in the ultrasonic transducer 120 (FIG. 1) (as well as to provide a logic "1" when transmitting a command);
2) drive the ID bus 130 low when clocking data (or to provide a logic "0" when transmitting a command); and
3) read the logic state of the ID bus 130 when receiving data.

The Transducer ID hardware 300 for the echosounder 110 (FIG. 1) can include a pair of MOSFETS 310, 320, a pair of resistors 330, 340, and a varistor 250. The ID bus 130 when not in use is pulled high through resistor 340. To address the problems associated with turning MOSFETS 310, 320 on simultaneously, an optional resistor 390 can be added to the circuit to limit current in the system.

The Transducer ID hardware 300 for the echosounder 110 can have three associated signals; a PCHG signal 360, a READ signal 370, and a NDRV signal 380. The PCHG signal 360 from a master processor, when low, turns on P-channel MOSFET Q2 (320) to drive the ID bus 130 high to +5 volts which charges the capacitor 220 in the ultrasonic transducer 120. The READ signal 370 allows the echosounder 110 to monitor the state of the ID bus 130, either high or low. The NDRV signal 380 from the echosounder 110, when high, turns on N-channel MOSFET Q1 (310) to drive the ID bus 130 low which can be done for a brief interval to transmit a logic "0." If the ID bus 130 is low long enough, the capacitor 220 in the transducer 110 discharges and the microcontroller 210 powers down.

In future implementations it is contemplated the system will digitally transmit temperature, speed, or other data to the echosounder. Further, a multiple-node protocol is contemplated that would allow additional transducers and/or echosounders to be connected to the same wire, allowing each device to be queried individually by the echo sounder (s).

FIGS. 4-7 show the timing of each of the four bit primitives. Communication between the echosounder's processor and the transducer's processor 210 (FIG. 2) is performed on a bit-by-bit basis and is controlled at all times by the echosounder's processor. Four bit primitives are defined: 1) a read data bit (from transducer's processor 210 to the echosounder's processor); a write "1" (from echosounder's processor to the transducer's processor 210 ); a write "0" (from echosounder's processor to the transducer's processor 210); and a reset of the transducer's processor 210.

All commands and replies are composed of sequences of these bit primitives. Each of the bit primitives begins with the echosounder's processor pulling the ID Bus 130 (FIG. 1) to low, followed by the echosounder's processor pulling the ID Bus 130 to high after a defined interval. The duration of this interval (i.e. low pulse width) determines which of the four bit primitives is in effect. The subsequent behavior of the echosounder's processor and the transducer's processor 210 will then vary depending on the bit primitive in effect.

Table 1 shows the timing characteristics of each bit primitive shown in FIGS. 4-7.

TABLE 1

| TIMING CHARACTERISTICS (−10° C. to +40° C.) | | | | | |
|---|---|---|---|---|---|
| SYMBOL | PARAMETER | MIN | TYP | MAX | UNITS |
| $t_{CYC}$ | Cycle Time | 100 | — | — | µS |
| $t_{RDL}$ | Read Clock Low Time | 8 | 10 | 12 | µS |
| $t_{PRE}$ | ID Bus Precharge Time | 2 | — | — | µS |
| $t_{HI-Z}$ | Read Bit High Impedance Time | — | — | 40 | µS |
| $t_{DR}$ | Time to Data Ready | 20 | — | 26 | µS |
| $t_{DH}$ | Data Hold Time | 9 | — | 11 | µS |
| $t_{WIL}$ | Write "1" Low Time | 17 | 19 | 21 | µS |
| $t_{WOL}$ | Write "0" Low Time | 28 | 30 | 32 | µS |
| $t_{RESETL}$ | Reset Time Low | 43 | — | — | µS |
| $t_{RESETH}$ | Reset Time High | 200 | — | — | µS |

The following should be noted with reference to the parameters: read clock low time; time to data ready; data hold time; write "1" low time; and write "0" low time. The timing takes into account variations due to oscillator tolerance and interrupt latency within the transducer's processor 210 (FIG. 2). However, the timing does not account for additional delays introduced by cable capacitance, etc.

The following should be noted with reference to the parameter: ID Bus precharge time. The required precharge time depends in part on the capacitance of the cable and the impedance of the drive circuit, as well as the current drawn by the transducer's processor 210 (FIG. 2).

The following should be noted with reference to the parameter: read bit high impedance time. Read bit high impedance time is the period of time during the read bit cycle that the ID bus is released to the high-impedance state by the echosounder. If the read bit high impedance time is allowed to be too long, the transducer's processor 210 (FIG. 2) will eventually discharge its keep-alive capacitor 220 (FIG. 2), causing the transducer's processor 210 to fall into an indeterminate state.

The following should be further noted with reference to the parameters: time to data ready and data hold time. If the echosounder's 110 processor samples at only one point, ideally the point would be midway between $t_{DR}(max)$ and $(t_{DR}(min)+t_{DH}(min))$. A more robust scheme would be where the echosounder's 110 processor would sample at multiple points between $t_{DR}(min)$ and $(t_{DR}(max)+t_{DH}(max))$. If all samples are high, the bit is a 1, and if some samples are low, the bit is a 0.

Each of the bit primitives begins with the echosounder's processor causing an ID Bus 130 transition from high to low. Each of the bit primitives ends with the echosounder's processor holding the ID Bus 130 in the high state. The interval of time between the end of one bit primitive and the start of the next is arbitrary and under the control of the echosounder's processor. By definition, this interval may last indefinitely, as long as the transducer's processor 210 remains powered up between bit primitives.

The only case where it is permissible for the transducer's processor 210 to drive the ID bus 130 low is during its allocated bit interval in the "Read" bit primitive. If the transducer's processor 210 intends to transmit a logic "1", it shall simply leave its output in the high impedance state and allow the pull-up resistor 340 to hold the ID Bus 130 high during the bit interval. If the transducer's processor 210 intends to transmit a logic "0", it shall place its output in the low impedance drive state, and drive the ID Bus 130 low for the duration of the bit interval. At the end of the bit interval, the transducer's processor 210 shall "release" the ID Bus 130 by again switching its output into the high impedance state, thereby causing the pull-up resistor 340 to gradually pull the ID Bus 130 high.

As stated above, all communication between the echosounder's processor and the transducer's processor 210 is controlled by the echosounder's processor. Several "commands" are defined which instruct the transducer's processor 210 to perform various operations. Each command is composed of an opcode followed (optionally, depending on the operation) by an address and/or data. The opcode, address, and data fields are each constructed of the bit primitives described above. All commands and data are transmitted LSB (least-significant bit) first.

Two special purpose commands have no associated opcode. They are RESET and CHECK_STATUS. The RESET command is simply a single Reset bit primitive, allowed at any time. The CHECK_STATUS command is composed of a single Read bit primitive, allowed only in certain contexts.

Table 2 shows commands for instructing the transducer's processor.

TABLE 2

Commands

| Command Mnemonic | Opcode | Address | Data Read Size |
|---|---|---|---|
| RESET | — | — | — |
| READ_VERSION | 0xCC | — | Variable |
| READ_BYTE | 0x33 | 8 bits (1 byte) | 8 bits (1 byte) |
| READ_BLOCK | 0x99 | — | Variable |
| CHECK_STATUS | — | — | 1 bit |

The RESET command instructs the transducer's processor 210 to immediately enter its initial state. Any commands that may have been in process when the RESET command is sent will be immediately aborted.

In a preferred embodiment, the echosounder's processor transmits a single "Reset" bit primitive, i.e. the ID Bus 130 is brought low for at least 43 microseconds, followed by a high for at least 200 microseconds. Upon detecting the RESET, the transducer's processor 210 will abort any command in process and enter its initial state.

Note, in one embodiment, the RESET command is not an 8-bit command composed of 1's and 0's. It instead employs the Reset bit primitive, which has a different timing than the other bit primitives used for commands. It is possible during a RESET command that the ID Bus 130 might be held low long enough to cause the capacitor 220 in the Transducer ID Hardware 200 to discharge, which in turn would cause the transducer's processor 210 to power down. Once the ID Bus 130 is brought high again, the transducer's processor 210 will again power up, and is expected to exhibit the same behavior at the end of the RESET command as though it had not powered down.

After performing a RESET command, the echosounder's processor may poll the transducer's processor 210 with a CHECK_STATUS command to confirm that the transducer's processor 210 is ready to receive a command.

In one embodiment, on initial power-up of the transducer's processor 210, the echosounder's processor must follow the RESET bit timing requirements. On initial power up, the $t_{RESETL}(min)$ parameter will have been easily met, since an infinitely long power down can be simply regarded as a very long reset low pulse. It is important to ensure, though, that the $t_{RESETH}(min)$ parameter is also met before transmitting any other commands; that is, the transducer's processor 210 must be given time to initialize itself during the reset high interval.

The READ_VERSION command reads the version string from the flash program memory of the transducer's processor 210. In one embodiment, the version string is encoded as ASCII text, in an applicable format. The first byte of the version string transmitted is a byte count that establishes how many additional bytes will be sent.

In a preferred embodiment, the echosounder's processor transmits opcode 0xCC, LSB first; no delay is required after sending the opcode. The transducer's processor 210 then reads from its flash memory the number of bytes in the version string. This value is regarded as a byte count. The transducer's processor 210 then prepares to transmit this value to the echosounder's processor. The echosounder's processor clocks the 8-bit byte count value, LSB first, from the transducer's processor 210. The byte count value will be the number of additional bytes read from the transducer's processor 210. The transducer's processor 210 reads from its flash memory each byte of its version string. The echosounder's processor clocks each byte of the version string in order, LSB first, from the transducer's processor 210.

Note, in one embodiment, after power up (or after a RESET command), the READ_VERSION command must be executed before the READ_BYTE or READ_BLOCK commands will respond.

The READ_BYTE command reads one byte of nonvolatile EEPROM memory from the transducer's processor 210. In a preferred embodiment, the echosounder's processor transmits opcode 0x33, LSB first, no delay is required after sending the opcode. The echosounder's processor transmits an 8-bit address, LSB first. The legal range of values for this address is 0 to 126 (decimal), inclusive. The most significant bit (bit 7) of the address will always be 0 (yielding seven significant digits); no delay is required after sending the 8-bit address. The transducer's processor 210 reads the data value at the specified address, an 8-bit value to be returned to the echosounder's processor. The echosounder's processor clocks the 8-bit reply from the transducer's processor 210.

Note, in one embodiment, after power up (or after a RESET command), the READ_BYTE command will be ignored until a READ_VERSION command is executed at least once, i.e., after the READ_BYTE command opcode and address operand are received, the "Read" bit primitives will simply be regarded as CHECK_STATUS commands. The legal range of values for the EEPROM address in the READ_BYTE command is 0 to 126 (decimal), inclusive. This allows access to only 127 of the 128 bytes in the PIC12F629 EEPROM. One byte, at EEPROM address 127, is reserved and may not be read by this command.

The READ_BLOCK command reads from the transducer's processor 210 a block of nonvolatile EEPROM memory following a predefined format. In this format, the first byte of EEPROM is regarded as a byte count that determines how many additional bytes will be read.

In a preferred embodiment, the echosounder's processor transmits opcode 0x99, LSB first; no delay is required after sending the opcode. The transducer's processor 210 reads the value stored in EEPROM address 0x00, and clears the most significant bit of the value read. This value is regarded as a byte count. The transducer's processor 210 prepares to transmit this value to the echosounder's processor. The echosounder's processor clocks the 8-bit byte count value, LSB first, from the transducer's processor 210. The byte count value will be the number of additional bytes read from the transducer's processor 210. The echosounder's processor clocks the additional number of bytes defined by the byte count value from the slave, LSB first.

Note, in one embodiment, after power up (or after a RESET command), the READ_BLOCK command will be ignored until a READ_VERSION command is executed at least once, i.e., after the READ_BLOCK command opcode is received, the "Read" bit primitives will simply be regarded as CHECK_STATUS commands. If the byte count value equals 0, no further bytes (beyond the byte count itself) are clocked by the echosounder's processor. After executing the READ_BLOCK command, the echosounder's processor should check that the error detection (CRC) value (last two bytes of the block) agrees with the received data before assuming the data are valid.

The CHECK_STATUS queries the transducer's processor 210 to determine if it is ready to receive a command. In a preferred embodiment, the echosounder's processor transmits a single "Read" bit primitive. Upon detecting the Read, the transducer's processor 210 responds by bringing the ID Bus 130 low during the designated read interval in the bit primitive.

Note, in one embodiment, the CHECK_STATUS command is not an 8-bit command composed of 1's and 0's, but is composed of a single bit primitive. The CHECK_STATUS command is identical to the Read bit primitive used for clocking data from the transducer's processor 210 in several of the other commands. The only difference is the context:
if the Read bit primitive is received when the transducer's processor 210 is waiting for the start of a command, then it should be interpreted as a CHECK_STATUS command.

In a preferred embodiment, the CHECK_STATUS command must not be transmitted by the echosounder's processor during the course of transmitting another command. If the CHECK_STATUS command is transmitted by the echosounder's processor when the transducer's processor 210 is busy performing another operation (such as writing to EEPROM), then the command will not be seen by the transducer's processor 210, and the ID Bus 130 will remain high during the Read bit primitive. This will indicate to the echosounder's processor that the s transducer's processor 210 is not ready to receive a command. Multiple CHECK_STATUS commands may be transmitted in sequence until the transducer's processor 210 indicates it is ready by bringing the ID Bus 130 low.

Error detection is performed by the encoding of a cyclic-redundancy check (CRC) value at the end of the stored EEPROM data. All bytes in the data block, including the byte count value at the beginning of the block, are included in the CRC calculation. After executing the READ_BLOCK command, the echosounder's processor should check that the CRC agrees with the received data before assuming the data are valid. As far as the transducer's processor 210 is concerned, the CRC value is simply another stored piece of EEPROM data that is transmitted upon request. The transducer's processor 210 has no intelligence to encode or decode a CRC value.

The CRC algorithm employed is the CRC-16 polynomial:

$$x^{16}+x^{15}+x^2+1$$

The 16-bit value is stored in EEPROM as the last two values in the data block in big endian form (most significant byte first).

A C routine of a preferred embodiment that calculates the CRC-16 polynomial for a given block of data is shown below:

```
/************************************************************
*                    xid_calculate_crc                      *
*************************************************************
**
**
** Description:    Calculate the 16-bit cyclic redundancy check value
**                 for the given data block based on the CRC-16 polynomial
**                 (x^16 + x^15 + x^2 + 1).
**
** Arguments:      uint8 * block_ptr: pointer to start of data block
**                 for which we will compute a checksum
**
**                 uint8 block_size: number of bytes in the block
**
** Return Value:   uint16: the computed CRC checksum
**
*/
uint16 xid_calculate_crc (uint8 * block_ptr, uint8 block_size)
{
    uint16 crc;
    uint16 j;
    uint8 i;
    /* If we initialized CRC to 0, then an initial run of 0's in the
    ** data input would not affect the checksum. Therefore, initialize
    ** to all 1's.
    */
    crc = 0xFFFF;
    for (j=0; j<block_size; j++) {  /* for each byte in block */
        crc ^= *block_ptr++;        /* fold byte into crc */
        for (i=0; i<8; i++) {       /* for each bit in byte */
```

```
            if (crc & 0x0001)
                /* CRC-16 polynomial is (x^16 + x^15 + x^2 + 1).
                ** This is binary (1 1000 0000 0000 0101), or 0x18005.
                ** Delete the redundant MSB, and reverse the order of the
                ** remaining bits, and we have 0xA001.
                */
                crc = ((crc >> 1) ^0xA001);
            else
                crc >>= 1;
        }
    }
    return crc;
}
```

The data stored in transducer's processor 210 is read by the echosounder's processor in the echosounder 110 (FIG. 1) and is interpreted by the echosounder's processor. As far as the transducer's processor 210 is concerned, the data stored in EEPROM has no format or meaning, except that the byte at address 0x00 contains the byte count for the entire block of data.

While this invention has been particularly shown and described with references to preferred embodiments thereof, it will be understood by those skilled in the art that various changes in form and details may be made therein without departing from the scope of the invention encompassed by the appended claims.

What is claimed is:

1. A transducer identification system for a marine vessel, comprising:
    at least one echosounder;
    at least one ultrasonic transducer adapted to be mounted below the waterline for generating an acoustic signal and detecting an echo signal, and containing identification information related to the at least one ultrasonic transducer; and
    a communications bus coupling the at least one echosounder and the at least one transducer, the communications bus communicating the detected echo signal and the identification information from the at least one transducer to the at least one echosounder based on a bi-directional communication protocol.

2. The transducer identification system of claim 1, wherein the at least one echosounder alters its operating parameters based on the identification information to optimize overall performance of the system.

3. The transducer identification system of claim 2, wherein the identification information includes at least one member selected from the group comprising: a) the resonant frequencies of the transducer; b) the impedances of the transducer at the transducer's resonant frequencies; c) the transducer's power rating; d) the date of manufacture of the transducer; e) the peak transmitting voltage response of the transducer; f) the receiving voltage response of the transducer; g) the figure of merit of the transducer; h) the model number of the transducer; i) the serial number of the transducer; j) the transducer's aging coefficient; k) information regarding the configuration of the transducer, such as the housing style, arrangement of piezoelectric elements, and type of acoustic window; 1) the beam width of the transducer; m) configuration and calibration information regarding an included temperature sensor; and n) configuration and calibration information regarding an included speed sensor.

4. The transducer identification system of claim 1, wherein the communications bus includes at least one member selected from the group comprising: a single wire bus, a multiple wire bus, and an optical fiber.

5. The transducer identification system of claim 1, wherein communications between the at least one echosounder and the at least one transducer is through a wireless communications link.

6. A transducer identification system for a marine vessel, comprising:
    an ultrasonic transducer adapted to be mounted below the waterline for generating an acoustic signal and detecting an echo signal and digitizing the echo signal; and
    a digital data bus for coupling transducer identification information and the digitized signal to an echosounder adapted to be mounted on the marine vessel.

7. A transducer identification system for a marine vessel, comprising:
    an ultrasonic transducer including:
        a housing adapted to be mounted below the waterline, the housing containing at least one piezoelectric element for generating an acoustic signal and detecting an echo signal and including at least one member selected from the group comprising: a speed sensor for providing a digitized signal of a speed of the vessel and a temperature sensor for providing a digitized signal of a temperature of water; and
        a digital data bus for coupling transducer identification information and the digitized signals to an echosounder adapted to be mounted on the marine vessel.

8. A method comprising:
    mounting a housing containing at least one piezoelectric element of an ultrasonic transducer below the waterline on a marine vessel for generating an acoustic signal and detecting an echo signal;
    mounting an echosounder on the marine vessel; and
    coupling transducer identification information and the detected echo signal to the echosounder over the communications bus based on a bi-directional communication protocol.

9. The method of claim 8, wherein the echosounder alters its operating parameters based on the identification information to optimize overall performance of the system.

10. The method of claim 8, wherein the communications bus includes at least one member selected from the group comprising: a single wire bus, a multiple wire bus, an optical fiber, and a wireless communications link.

11. The method of claim 8, wherein the housing further contains at least one member selected from the group comprising: a speed sensor for providing a signal of a speed of the vessel, and a temperature sensor for providing a signal of a temperature of water.

12. A transducer identification system for a marine vessel, comprising:
- an ultrasonic transducer adapted to be mounted below the waterline for generating an acoustic signal and detecting an echo signal; and
- a communications bus for coupling transducer identification information and the detected echo signal to an echosounder adapted to be mounted on the marine vessel based on a bi-directional communication protocol.

13. A transducer identification system for a marine vessel, comprising:
- an ultrasonic transducer including:
  - a housing adapted to be mounted below the waterline, the housing containing at least one piezoelectric element for generating an acoustic signal and detecting an echo signal and including at least one member selected from the group comprising: a speed sensor for providing a speed signal of a speed of the vessel and a temperature sensor for providing a temperature signal of a temperature of water; and
- a communications bus for coupling transducer identification information and the signals to an echosounder adapted to be mounted on the marine vessel based on a bi-directional communication protocol.

* * * * *